Patented June 30, 1925.

1,544,441

UNITED STATES PATENT OFFICE.

JAROSLAV FRÖHLICH, OF BASEL, SWITZERLAND, ASSIGNOR TO SOCIETY OF CHEMICAL INDUSTRY IN BASLE, OF BASEL, SWITZERLAND.

NEW DYESTUFFS AND PROCESS OF MAKING SAME.

No Drawing.     Application filed October 28, 1924. Serial No. 746,421.

*To all whom it may concern:*

Be it known that I, JAROSLAV FRÖHLICH, a citizen of the Swiss Confederation, and residing at Basel, Switzerland, have invented useful New Dyestuffs and Processes of Making Same, of which the following is a full, clear, and exact specification.

The present invention relates to new vat dyestuffs which are particularly valuable for producing fast tints on the animal fibre. The invention comprises the new dyestuffs, the method of making same, and the material dyed with the new vat dyestuffs.

It has been found that valuable vat dyestuffs are obtained by causing a thionyl-halide ($SOHlg_2$) to act upon 2:5-diarylido-benzoquinones. This reaction may be conducted in presence of a diluent and with addition of an agent which binds acids, as for example sodium acetate or magnesium oxide, and a condensing agent, as for example sulphuric acid. The temperature and the proportion which the reacting substances bear to each other may be varied within wide limits.

For obtaining dyestuffs of a darker tone it is in general advantageous to operate at higher temperatures which may rise to the boiling point of the diluent, as for instance nitrobenzene.

Particularly suitable for the reaction are 2:5-diarylidobenzoquinones, which are not substituted or are only mono-substituted (in 3- or 6-position) in the quinone nucleus. They react even at ordinary temperature with dyestuff formation, whereas the 3:6-disubstitution-derivatives in most cases require a higher temperature. The 2:5-diarylidobenzoquinones, the manufacture of which is generally known, may be derived from two aromatic amines which may be the same or different and may be mono-substituted at the nitrogen or mono- or poly-substituted at any position in the nucleus. As substituents there may be named, among others, halogen, alkyl-, alkoxyl- ($OCH_3$), phenyloxy- ($OC_6H_5$), nitro-, amino-, alkyl-amino-, aralkylamino-, phenylamino-, hydroxyl- or carboxyl-groups.

The dyestuffs thus obtained form yellow to dark brown and black powders and may contain halogen and sulphur. They dissolve in concentrated sulphuric acid to brown to red and blue solutions. With hydrosulphite and caustic soda lye they give bright yellow to brown vats from which wool is dyed fast yellow to brown, olive and grey tints.

The following examples illustrate the invention without, however, limiting the scope of the same, the parts being by weight:—

Example 1.

7.2 parts of 2:5-dianilidobenzoquinone are suspended in 144 parts of nitrobenzene, 9 parts of thionyl chloride ($SOCl_2$) are added and the whole stirred for several hours at below 5° C.

A test sample is filtered and the solid matter washed; it is a greenish-yellow powder which dissolves in concentrated sulphuric acid to a red solution and dyes wool in a hydrosulphite vat a purer yellow than that of the parent dyestuff.

If the mixture is stirred for a long time at a somewhat higher temperature, for example at 15° C., there is obtained by filtering and washing a bright brown powder which dissolves in concentrated sulphuric acid to a violet-red solution and dyes wool strong yellow-brown in the hydrosulphite vat.

Similarly, still more brown and darker dyestuffs are formed at 35-40° C., or at temperature up to 205° C. an acid binding agent, such as magnesia, may be added.

These products contain chlorine and also sulphur.

Example 2.

40 parts of 2:5 dianilido-6-chloro-1:4-benzoquinone are suspended in 800 parts of nitrobenzene and the suspension is mixed at 5° C. with 40 parts of thionyl chloride. The whole is stirred for a long time in the cold or at ordinary temperature and there is obtained a dyestuff which is a bright brown powder, soluble in concentrated sulphuric acid to a red-violet solution and dyeing wool in the vat yellow-brown tints. A similar dyestuff is obtained by operating without a diluent. By raising the temperature the tint of the dyestuff is shifted towards red. For example, if the temperature of the operation is 100–120° C. and continued for some time, there is obtained a dyestuff which dissolves in sulphuric acid to a violet solution and dyes wool in the vat orange-brown; if the temperature is carried to the boiling point the dyestuff produced dissolves in concentrated sulphuric acid to a blue solution and dyes wool in the vat brown-red.

Example 3.

78 parts of 2:5-dianilido-6-methylbenzoquinone are suspended in 1000 parts of nitrobenzene and mixed at 15° C. with 90 parts of thionyl chloride. The whole is stirred for some time, filtered, washed, and dried. There is thus obtained a dark powder which dissolves in concentrated sulphuric acid to a magenta red solution and dyeing wool in a vat brown-yellow.

The following table exhibits the main properties of a number of dyestuffs which can be obtained by the present invention:

| Diarylidoquinone | Sulphur halogen compound | Solvent | Temperature | Appearance of the dyestuff powder | Colour of the solution in sulphuric acid | Dyeing on wool in the vat |
|---|---|---|---|---|---|---|
| 2:5 - para - para - dichloro - dianilido-benzoquinone. | 3 mol. thionyl-chloride. | Nitrobenzene. | Boiling. | Dark brown. | Reddish blue. | Brown. |
| 2:5-para-para-ditoluidido-benzoquinone. | Do. | Do. | Cold. | Yellow-brown. | Blue. | Yellow-brown. |
| 2:5-meta-meta-ditoluidido-benzoquinone. | Do. | Do. | Cold up to 120° C. | Yellow-brown to red-brown. | Red-violet to reddish-blue. | Yellow-brown to red-brown. |
| 2:5-dimeta-xylidido-benzoquinone. | Do. | Do. | 100° C. | Dark olive. | Greenish-grey. | Grey-olive. |
| 2:5-dipara-anisidido-benzoquinone. | Do. | Do. | 100° C. up to boiling. | Red-brown to brown-black. | Pure blue to greenish blue. | Brown-violet. |
| 2:5-dipara-phenetidido-benzoquinone. | Do. | Do. | 100-120° C. | Dark red-brown. | Greenish blue. | Violet-brown. |
| 2:5-di(β-naphthyl-amido-)-benzoquinone. | Do. | Do. | Cold up to 100° C. | Dark brown. | Reddish-blue to dirty blue. | Brown to grey. |
| 2:5-diortho-nitranilido-benzoquinone. | Do. | Do. | 100° C. up to boiling. | Dark yellow, brown, brown-black. | Red-brown, dull yellow green. | Red-brown, acidified to violet brown. |
| 2:5-dimeta-nitranilido-benzoquinone. | Do. | Do. | Cold up to boiling. | Yellow-brown to dark brown. | Brown to yellow-olive. | Brown. |
| 2:5-di-para-oxyanilido-benzoquinone. | Do. | Do. | Do. | Reddish-brown to black. | Blue. | Yellow-brown, olive to grey. |

What I claim is:

1. As a new process, the manufacture of vat dyestuffs, which consists in causing thionyl-chloride to act upon 2:5-diarylidobenzoquinones.

2. As a new process, the manufacture of vat dyestuffs, which consists in causing thionyl-chloride to act upon 2:5-diarylidobenzoquinones in presence of a diluent.

3. As a new process, the manufacture of vat dyestuffs, which consists in causing thionyl-chloride to act upon 2:5-dianilidobenzoquinone.

4. As a new process, the manufacture of vat dyestuffs, which consists in causing thionyl-chloride to act upon 2:5-dianilidobenzoquinone in presence of a diluent.

5. As new products, the dyestuffs obtained from 2:5-diarylidobenzoquinones and thionyl-chloride, which form yellow to dark brown and black powders, dissolving in concentrated sulphuric acid to brown to red and blue solutions and giving with hydrosulphite and caustic soda lye bright yellow to brown vats from which wool is dyed fast yellow to brown, olive, and grey tints.

6. As new products, the dyestuffs obtained from 2:5-diarylidobenzoquinones and thionyl-chloride containing sulphur and also chlorine, which form yellow to dark brown and black powders, dissolving in concentrated sulphuric acid to brown to red and blue solutions and giving with hydrosulphite and caustic soda lye bright yellow to brown vats from which wool is dyed fast yellow to brown, olive, and grey tints.

7. As new products, the dyestuffs obtained from 2:5-dianilidobenzoquinone and thionyl-chloride containing sulphur and also chlorine, which form yellow to dark brown and black powders, dissolving in concentrated sulphuric acid to brown to red and blue solutions and giving with hyrdosulphite and caustic soda lye bright yellow to brown vats from which wool is dyed fast yellow to brown, olive, and grey tints.

8. Material dyed with the dyestuffs of claim 5.

9. Material dyed with the dyestuffs of claim 6.

10. Material dyed with the dyestuffs of claim 7.

In witness whereof I have hereunto signed my name this 16th day of October 1924, in the presence of two subscribing witnesses.

JAROSLAV FRÖHLICH.

Witnesses:
AMAND BRAUN,
JAS. RIEK, Jun.